(12) United States Patent
Sheen

(10) Patent No.: US 6,188,042 B1
(45) Date of Patent: Feb. 13, 2001

(54) CIGARETTE LIGHTER WITH SPRING BIASED CONTACT MEMBER ENABLING SWITCHING BETWEEN BATTERY CHARGING AND HEATING

(76) Inventor: Dong Suk Sheen, #514-504 Jookong Apt., Jamsil-5 dong, Songpa-ku, Seoul (KR)

( * ) Notice: Under 35 U.S.C. 154(b), the term of this patent shall be extended for 0 days.

(21) Appl. No.: 09/418,973

(22) Filed: Oct. 14, 1999

(30) Foreign Application Priority Data

Oct. 14, 1998 (KR) ................................................ 98-42988

(51) Int. Cl.⁷ ...................................................... B60N 3/14
(52) U.S. Cl. ............................................. 219/268; 219/266
(58) Field of Search .................................... 219/268, 266, 219/263, 262

(56) References Cited

U.S. PATENT DOCUMENTS 5,354,968 * 10/1994 Yamamura ............................ 219/268

FOREIGN PATENT DOCUMENTS

2481659 * 11/1981 (FR) .
54-65669 * 5/1979 (JP) .
55-155117 * 12/1980 (JP) ..................................... 219/268

* cited by examiner

Primary Examiner—John A. Jeffery
(74) Attorney, Agent, or Firm—Jacobson, Price, Holman & Stern, PLLC

(57) ABSTRACT

Disclosed is a charging electric lighter including a cylindrical body comprised of a DC external power supply to which power is supplied from the outside and a fixed housing coated by a first conductor on the internal surface thereof and having a space portion into which a portable body is inserted, and the portable body comprised of an ignition part in which a resistance heating body such as, for example, a filament is installed, a partition part formed on the bottom portion of the ignition part, an internal power supply having a circular projection on the external surface thereof and a groove formed on the internal side thereof, into which a tension spring is compressed and expanded in accordance with the assembly/disassembly with/from the cylindrical body, the internal power supply coated by a second conductor on the external surface thereof, a charging part into which a charger is received to be charged/discharged by the power supplied through contact points on the both ends thereof and protruded contact points, and a separated housing for supporting the ignition part, the partition part, the internal power supply and the charging part and having a hole into which the circular projection is protruded, the separated housing coated by a third conductor on the internal surface thereof and separated into two stages.

2 Claims, 4 Drawing Sheets

FIG. 1
FIG. 1A
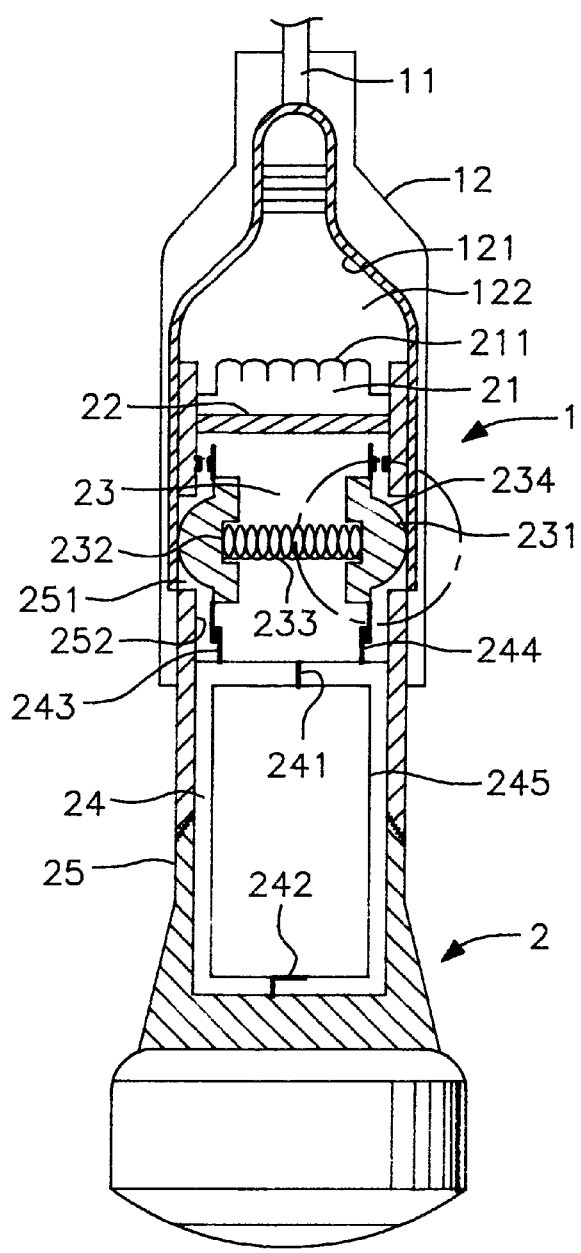
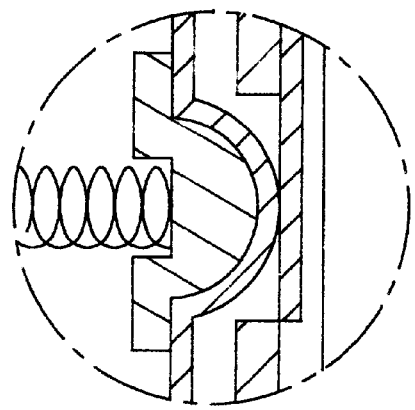

CIGARETTE LIGHTER WITH SPRING BIASED CONTACT MEMBER ENABLING SWITCHING BETWEEN BATTERY CHARGING AND HEATING

BACKGROUND OF THE INVENTION

1. Field of the Invention

The present invention relates to an electric lighter, and more particularly, to an electric lighter which installs a rechargeable battery therein and if the supply of a charging current stops due to the cut-off of external power, heats a hot wire by the discharging of the rechargerable battery, to be thereby ignited.

2. Discussion of Related Art

Lighters are generally classified into an oil lighter, a gas lighter, an electric lighter, etc. In more detail, the oil lighter is constructed in such a manner that an additive is mixed into a volatile oil and a wick connected to the mixture is thus ignited by means of a lighter stone.

The gas lighter is constructed in such a manner that the gasified gas by the use of a liquefied gas is ignited by means of a lighter stone or an electronic gun which generates a momentary high voltage.

On the other hand, the electric lighter is widely used as a cigar lighter installed in a vehicle, which is constructed in such a manner that a high voltage is applied to a resistant body such as, for example, a filament and a heat source is thus supplied by the operation of the resistant heat generated from the resistant body.

Since the oil lighter and gas lighter are used in the state where the flame is formed upwardly in view of the characteristics of the structure and fuel thereof, however, there occurs a problem that if they are to be used in a downward direction or in an area where the use of firearms is restricted, they can not be freely used.

Therefore, in the area where the direction of the position to be used or the use of firearms is restricted, for example, in the automobile during running, it is convenient to use the electric lighter.

However, since a conventional electric lighter heats the hot wire by the ignition operation and, after completion of the heating for a predetermined time, is used during the heating of the heated hot wire without any supply of power, there still are some problems in that the usable life is short and a heat expansion volume is enlarged to prolong the heating maintaining time of the hot wire, which results in the increment of a preheating time.

Specifically, in case of the cigar lighter used in the automobile, it should be used within the heating maintaining time during the running, such that the limited time of the heating maintaining time becomes an obstacle to the safety running. At this time, instead of using the cigar lighter attached to the vehicle, most of drivers use a general portable lighter. Unfortunately, this may cause an unexpected explosion of the portable gas lighter due to the increment of an internal temperature of the vehicle in summer.

SUMMARY OF THE INVENTION

Accordingly, the present invention is directed to an electric lighter that substantially obviates one or more of the problems due to limitations and disadvantages of the related arts.

An object of the invention is to provide an electric lighter which is capable of continuously supplying power to an ignition part, to be thereby used without any delay, if necessary, and reducing a hot wire volume at a minimum of size, to thereby heat the hot wire without any delay, such that it can extend a usable life, decrease the heat expansion volume of the hot wire to shorten a preheating time, and be freely used in the area where the use of firearms is restricted or in the automobile during running.

According to an aspect of the present invention, there is provided an electric lighter including: a cylindrical body comprised of a DC external power supply to which power is supplied from the outside and a fixed housing coated by a first conductor on the internal surface thereof and having a space portion into which a portable body is inserted; and the portable body comprised of an ignition part in which a resistance heating body such as, for example, a filament is installed, a partition part formed on the bottom portion of the ignition part, an internal electrical power connection means having a circular projection on the external surface thereof and a groove formed on the internal side thereof, into which a tension spring is compressed and expanded in accordance with the engagement with the cylindrical body, the internal electrical power connection means coated with a second conductor on the external surface thereof, a rechargerable battery adapted to be charged by the power supplied through contact points on the both ends thereof and protruded contact points, and a separated housing for supporting the ignition part, the partition part, the internal electrical power connection means and the rechargerable battery, the separated housing and having a hole into which the circular projection is protruded, the separated housing coated with a third conductor on the internal surface thereof and separated into two stages.

According to another aspect of the present invention, there is provided a portable electric lighter including: an ignition part in which a resistance heating body such as, for example, a filament is installed and a switch is provided to be switched by the load generated when an opening part formed on the upper portion of the one side thereof is opened, the ignition part coated by a conductor on the internal surface thereof; a charging part having external power supply terminals formed on the lower portion thereof, for receiving power by the contact with the terminals of an adapter used in charging AC and DC and having a rechargerable battery for discharging through the external power supply terminals, in the case where the switch is contacted with the conductor thereof by the load generated when the opening part is opened downwardly, the charging part coated by a conductor on the internal surface thereof; and a portable case adapted to support the ignition part and the charging part.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings.

In the drawings:

FIG. 1 is a sectional view illustrating the construction of an electric lighter according to an embodiment of the present invention;

FIG. 1A is an enlarged view of FIG. 1;

DETAILED DESCRIPTION OF PREFERRED EMBODIMENT

Reference will now be made in detail to the preferred embodiments of the present invention, examples of which are illustrated in the accompanying drawings.

Figure 2:
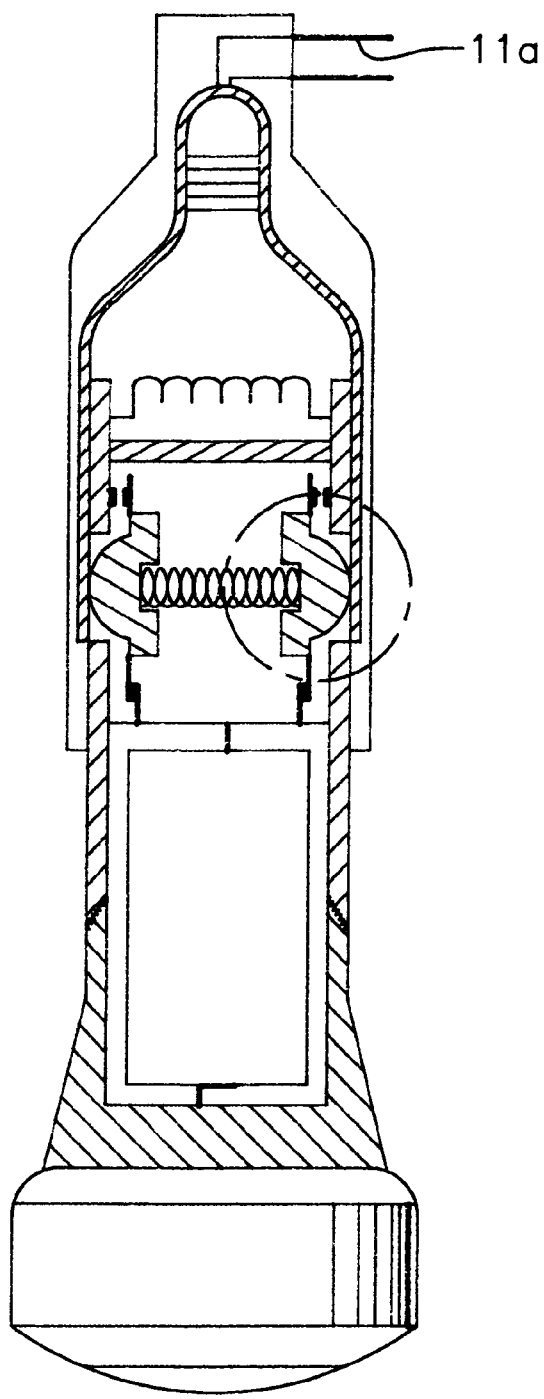
FIG. 2 is a sectional view illustrating the construction of the electric lighter of the present invention having a power supply different from that in FIG. 1.
Figure 2A:
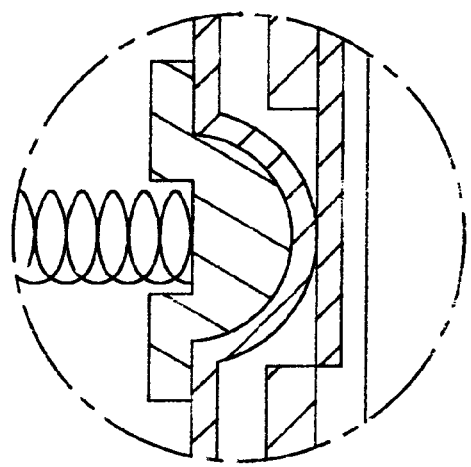
FIG. 2A is an enlarged view of FIG. 2.
Figure 3:
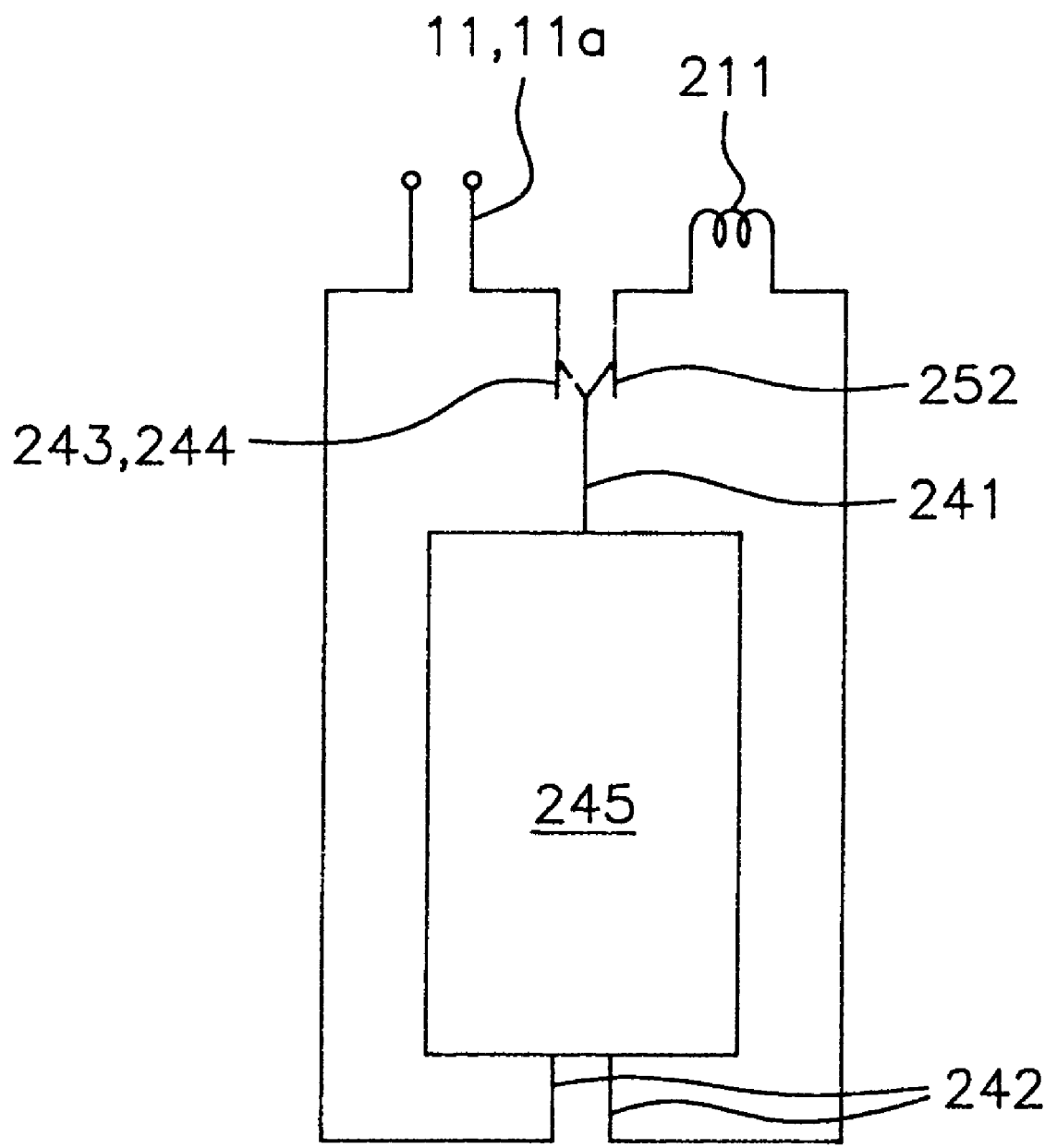
FIG. 3 is a circuit view of FIG. 1.

FIG. 1 is a sectional view illustrating the construction of an electric lighter according to an embodiment of the present invention, FIG. 2 is a sectional view illustrating the construction of the electric lighter the present invention having a power supply different from that in FIG. 1, and FIG. 3 is a circuit view of FIG. 1.

In construction, the electric lighter of the present invention includes a cylindrical body 1 and a portable body 2. The cylindrical body 1 is comprised of a DC external power supply 11 to which power is supplied from the outside and a fixed housing 12 coated by a conductor 121 on the internal surface thereof and having a space portion 122 into which the portable body 2 is inserted.

On the other hand, the portable body 2 is comprised of an ignition part 21 in which a resistance heating body 211 such as, for example, a filament is installed, a partition part 22 formed on the bottom portion of the ignition part 21, an internal electrical power connection means 23 having a circular projection 231 on the external surface thereof and a groove 232 formed on the internal side thereof, into which a tension spring 233 is compressed and expanded in accordance with the assembly/disassembly with/from the cylindrical body 1, the internal electrical power connection means 23 coated by a conductor 234 on the external surface thereof, a charging part 24 into which a rechargerable battery 245 is received to be charged/discharged by the power supplied through contact points 241, 242 on the both ends thereof and protruded contact points 243, 244, and a separated housing 25 for supporting the ignition part 21, the partition part 22, the internal electrical power connection means 23 and the charging part 24 and having a hole 251 into which the circular projection 231 is protruded, the separated housing 25 coated by a conductor 252 on the internal surface thereof and separated into two stages.

FIG. 3 shows a plug type of an AC external power supply 11a which is inserted into a general home plug socket in the electric lighter according to the embodiment of the present invention. The electric lighter can be used in the automobile, on the table, or portably in accordance with the type of the external power supply 11.

The plug type of an AC external power supply 11a takes a receiving shape, and a rectifying part for rectifying the AC supplied from the AC external power supply 11a to a DC is well known, explanation of which will be avoided.

FIG. 3 is a circuit view of FIG. 1, which shows the DC/AC external power supplies 11 and 11a for supplying the external power to the rechargerable battery 245 and a circuit in which a voltage is loaded to the resistance heating body 211 by the discharging of the rechargerable battery 245. The change of the power supply circuit is made by contacting the both ends 241 and 242 of the charger 245 with either the conductor 252 or the protruded contact points 243 and 244 in accordance with the attachment/detachment of the portable body 2.

Now, an explanation of the operation of the charging the present invention according to the embodiment of the present invention will be discussed.

1) Embodiment of Operation Upon Supply of External Power

The DC, which is supplied from the DC external power supply 11, is contacted, via the conductor 121 on the internal surface of the fixed housing 12, with the conductor 234 coated on the surface of the circular projection 231 of the internal electrical power connection means 23 of the portable body 2 inserted into the space portion 122. As a result, the charger 245 is charged with the DC through the protruded contact points 243 and 244 and the contact points 241 and 242.

2) Embodiment of Operation Upon Cut-off of External Power

If the cylindrical body 1 and the portable body 2 are separated, the force applied to the input/output of the fixed housing 12 of the cylindrical body 1 disappears from the circular projection 231 of the internal electrical power connection 23. Thus, the tension spring 233 inserted into the groove 232 formed in the internal direction is expanded to thereby short-circuit the conductor 234 coated on the external surface of the internal electrical power connection means 23 from the protruded contact points 243 and 244 of the charging part 24. As a result, the circular projection 231 is protruded to the hole 251 of the separated housing 25 and concurrently contacted with the conductor 252 coated on the internal surface of the separated housing 25. Accordingly, the voltage is locked to the resistance heating body 211 such as, for example, the filament to thereby generate a resistant heat.

Figure 4:
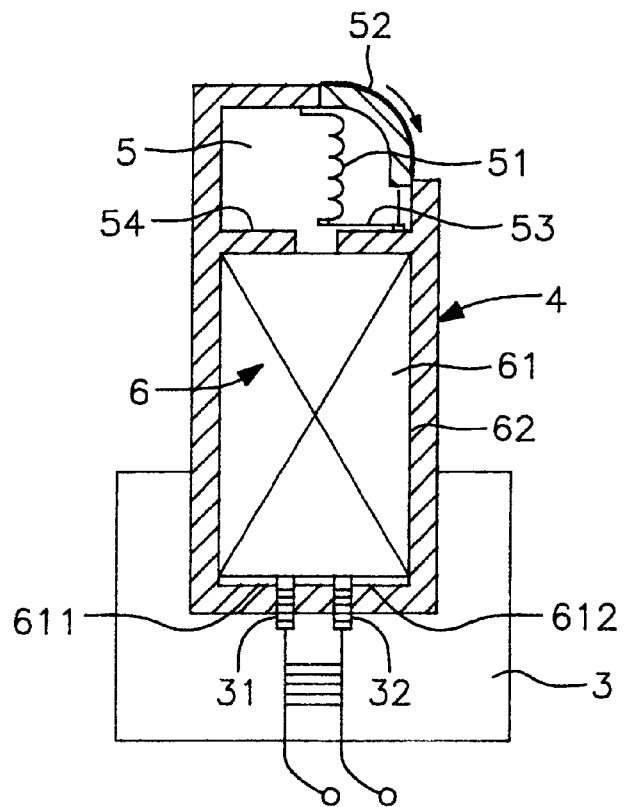
FIG. 4 is a sectional view illustrating the construction of a portable electric lighter according to another embodiment of the present invention.
Figure 5:
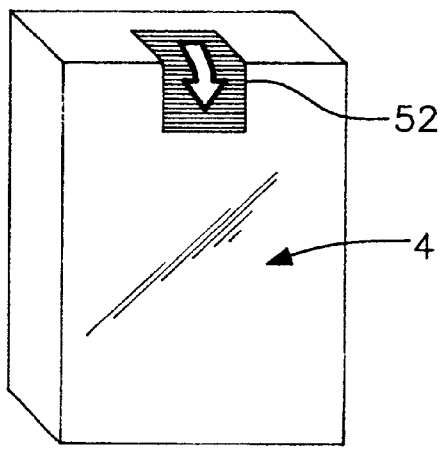
FIG. 5 is a perspective view of FIG. 4.

On the other hand, FIG. 4 is a sectional view illustrating the construction of a portable electric lighter according to another embodiment of the present invention, and FIG. 5 is a perspective view of FIG. 4.

In construction, the portable electric lighter includes: an ignition part 5 in which a resistance heating body 51 such as, for example, a filament is installed and a switch 53 is provided to be switched by the load generated when an opening part 52 formed on the upper portion of the one side thereof is opened, the ignition part 5 coated by a conductor 54 on the internal surface thereof; a charging part 6 having external power supply terminals 611 and 612 formed on the lower portion thereof, for receiving power by the contact with the terminals 31 and 32 of an adapter 3 used in charging AC and DC and having a charger 61 for discharging through the external power supply terminals 611 and 612, in the case where the switch 53 is contacted with the conductor 54 thereof by the load generated when the opening part 52 is opened downwardly, the charging part 6 coated by a conductor 62 on the internal surface thereof; and a portable case 4 adapted to support the ignition part 5 and the charging part 6.

In operation, after the supply of external power stops, in the case where the switch 53 is contacted with the conductor 54 by the load generated upon the downward opening of the opening part 52, the power is discharged through the external power supply terminals 611 and 612, thus to heat the resistance heating body 51.

As discussed above, an electric lighter according to the preferred embodiments of the present invention is capable of continuously supplying power from a charging part charged with an external power to an ignition part, upon separation of the lighter from a cylindrical body, and reducing a heat expansion volume of a hot wire such as a filament at a minimum of size, to thereby heat the hot wire without any delay, such that it can extend a usable life, decrease the heat expansion volume of the hot wire to shorten a preheating time, and be freely used in the area where the use of firearms is restricted or in the automobile during running.

In addition, an electric lighter of the present invention has the following advantages: it can provide a stable and convenient use to a driver or his or her company during running of a vehicle; and it can be used in the automobile, on the table, or portably in accordance with the type of an external power supply.

It will be apparent to those skilled in the art that various modifications and variations can be made in an electric lighter of the present invention without departing from the spirit or scope of the invention. Thus, it is intended that the present invention cover the modifications and variations of this invention provided they come within the scope of the appended claims and their equivalents.

What is claimed is:

1. An electric lighter comprising:

a cylindrical body comprising a DC external power supply connector to which external electrical power is supplied and a fixed housing with a first conductor coated on the internal surface thereof and having a space portion into which a portable body is inserted; and said portable body comprising an ignition part in which a resistance heating body comprising a filament is installed, a partition part formed on the bottom portion of said ignition part, an internal electrical power connection means having a circular projection on the external surface thereof and a groove formed on the internal side thereof, into which a tension spring is compressed and expanded in accordance with the engagement with said cylindrical body, said internal electrical power connection means coated with a second conductor on the external surface thereof, a rechargeable battery adapted to be charged by the power supplied through contact points on the both ends thereof and protruded contact points, and a separated housing for supporting said ignition part, said partition part, said internal electrical power connection means and said rechargeable battery, said separated housing having a hole into which said circular projection is protruded, said separated housing coated with a third conductor on the internal surface thereof and separated into two stages.

2. The lighter as defined in claim 1, wherein direct current from said DC external power supply is acquired from an AC external power supply.

* * * * *